Figure 1:
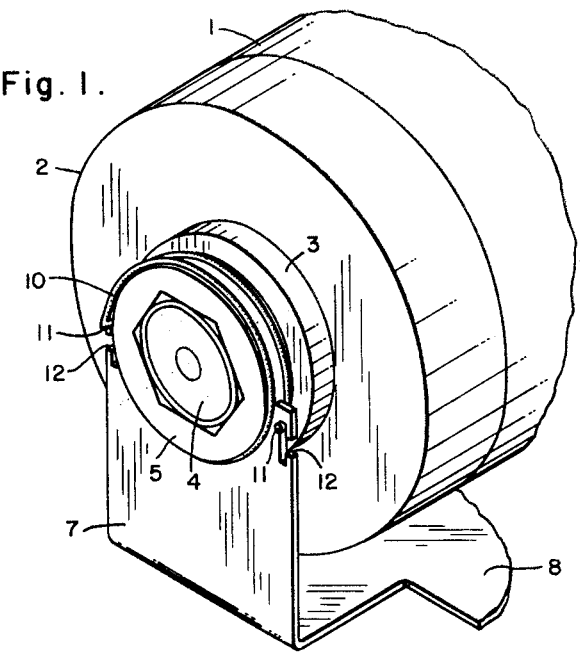

Dec. 8, 1964 G. E. HERZOG 3,160,377
RESILIENT MOUNTING FOR DYNAMOELECTRIC MACHINES
Filed April 30, 1962

WITNESSES
Robert C Baird
James F. Young

INVENTOR
George E. Herzog.
BY
ATTORNEY

United States Patent Office 3,160,377
Patented Dec. 8, 1964

3,160,377
RESILIENT MOUNTING FOR DYNAMOELECTRIC MACHINES
George E. Herzog, Shawnee Township, Allen County, Ohio, assignor to Westinghouse Electric Corporation, East Pittsburgh, Pa., a corporation of Pennsylvania
Filed Apr. 30, 1962, Ser. No. 191,115
2 Claims. (Cl. 248—26)

The present invention relates to mounting means for resiliently supporting dynamoelectric machines and, more particularly, it relates to a one-piece spring mounting ring for clamping a resiliently mounted dynamoelectric machine to its base.

Many dynamoelectric machines, and especially fractional horsepower single-phase motors, must be resiliently mounted to prevent or greatly reduce transmission of vibration from the machine to its base or other supporting structure. This is usually done by means of resilient mounting rings placed on the hub portions of the end brackets at each end of the motor and clamped to the base, so that the motor is entirely supported by the resilient mounting rings which absorb and damp out any vibration occurring in the motor. In the conventional construction, the resilient rings are clamped to the base by clamps which consist of two arcuate metal pieces, joined together by a nut and bolt above the mounting ring, and with their opposite ends engaged in notches in the base on either side of a cradle in which the mounting ring rests. The pressure exerted by the clamp as the two pieces are drawn together by the nut and bolt holds the mounting ring in place.

This type of arrangement has many disadvantages and is relatively expensive. The dimensions of each piece of the clamp must be held to close tolerances in order to achieve firm clamping action, which requires very accurate dies for forming the clamps, and a plating operation is usually required after forming to provide corrosion resistance. Thus, the conventional clamp is expensive to manufacture. The assembly labor and difficulty involve further disadvantages. The nut and bolt arrangement must be preassembled, and after the clamp has been assembled on the motor, the bolt must be tightened again to secure the clamp and obtain the proper clamping pressure.

The principal object of this invention is to overcome the foregoing and other disadvantages of the conventional clamp for resiliently mounted dynamoelectric machines by the provision of a better and less expensive mounting ring clamp.

Another object of the invention is to provide a one-piece mounting ring clamp which can easily be formed from heavy wire without requiring the use of expensive dies.

A further object is to provide a simple one-piece mounting clamp for a dynamoelectric machine whose dimensions are less critical than those of the conventional four-part clamp assembly.

Still another object is to provide a better and less expensive resilient mounting clamp for a dynamoelectric machine in which no preassembly labor is required before installing the clamp on the dynamoelectric machine and no additional operations are required after the clamp is installed.

Figure 2:
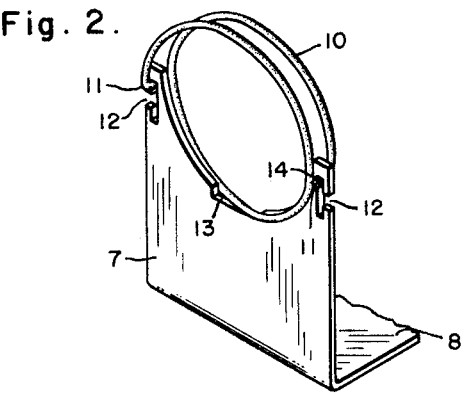

Other objects and advantages of the invention will be apparent from the following detailed description, taken in connection with the accompanying drawing, in which:

FIG. 1 is a perspective view of one end of a resiliently mounted dynamoelectric machine embodying the present invention; and FIG. 2 is a perspective view of a mounting ring clamp.

An illustrative embodiment of the invention is shown in FIG. 1 applied to a dynamoelectric machine, such as a small motor, having a stationary member comprising a frame 1 to which are secured end brackets 2. The rotating member of the dynamoelectric machine is supported in bearings disposed in hubs 3 in the end brackets 2. The hub 3 has a reduced end portion 4 which may be of polygonal cross-section, as shown. Both ends of the motor may be of identical construction. The motor is resiliently supported at each end by a resilient mounting ring 5, which may be made of rubber or other suitable elastomeric material. The ring 5 fits snugly on the reduced portion 4 of the end bracket 2. The base or cradle on which the motor is supported has generally vertical end portions 7 at each end and a horizontal base or mounting portion 8. The upper ends of the vertical portions 7 have arcuate edges which conform to the shape of the ring 5.

As previously indicated, in the conventional construction of motors of this type, the resilient mounting ring 5 at each end is clamped to the base by two arcuate clamps which engage in notches in the base and are clamped together by a bolt and nut above the mounting ring. These clamps are relatively expensive to manufacture with the necessary accuracy of dimensions and curvature, and must be plated for corrosion resistance. The four-part construction of this clamping assembly involves considerable labor, since the nut and bolt must first be put in place before the clamps are assembled on the motor, and, after assembly, the bolt must be tightened to obtain the necessary clamping pressure. Thus, the conventional construction for resiliently mounted motors is quite expensive.

The present invention enables the same type of resilient support to be achieved at considerably lower cost through the use of a single ring clamp rather than the four-part arrangement previously used. In the embodiment shown in the drawing, a one and one-half turn helical spring 10 is utilized for clamping the resilient ring 5 and securing it to the base. The helical spring 10 tightly engages the mounting ring 5, completely encircling the ring, and the ends 11 of the spring 10 are turned at right angles to engage in notches 12 in the base 7. A notch 13 is cut in the arcuate edge of the base 7 to provide clearance for the spring 10 so that it can completely encircle the mounting ring 5 without preventing firm contact between the ring and the base. The geometry of the helical spring 10 is controlled to provide positive pressure against the ring 5 when the ends 11 are engaged in the notches 12. The notches 12 have recessed upper portions, as indicated at 14, so that the spring clamp cannot shake or vibrate loose. The notch 13 in the top edge of the base provides clearance for the spring clamp so that the ring 5 can be seated firmly.

Thus, there is provided a simple one-piece spring clamp. The springs 10 is preferably made of heavy wire, which may be plated or otherwise made corrosion-resistant, so that plating after forming the clamp is unnecessary. The dimensions of the spring clamp are less critical than those of the four-part clamp assembly previously used, since the spring action will force the spring clamp to conform to the shape of the mounting ring. The spring clamp is a single piece instead of the four pieces previously required, thereby greatly reducing handling and stocking problems, as well as substantially reducing the labor of assembling the clamp on the motor. Since the clamping action extends over the entire circumference of the mounting ring, better control may be exercised over the clamping pressure by controlling the spring dimensions than is possible with the conventional four-part clamp which operates over only half the circumference of the mounting ring.

While one specific embodiment of the invention has been shown and described in detail, for the purpose of illustration, it is to be understood that the invention is not limited thereto since other embodiments and modifications are possible and are within the scope of the invention.

I claim as my invention:

1. In combination, a dynamoelectric machine having resilient mounting rings at opposite ends thereof, mounting means for said machine comprising a base member having generally vertical portions at each end adapted to engage said mounting rings to resiliently support the machine, and a helical spring member tightly engaging each mounting ring around its entire circumference, the vertical portions of the base member having notches therein and the end portions of said spring members being formed to engage in said notches to clamp the mounting rings in place on the vertical portions of the base member.

2. In combination, a dynamoelectric machine having resilient mounting rings at opposite ends thereof, mounting means for said machine comprising a base member having generally vertical portions at each end adapted to engage said mounting rings to resiliently support the machine, said vertical portions having generally arcuate upper ends conforming to the mounting rings and having a central notch therein, and a helical spring member tightly engaging each mounting ring around its entire circumference and passing through said notch in the vertical portion of the base member, said vertical portions having notches at the sides thereof and said spring members having their end portions formed to engage in the last-mentioned notches to clamp the mounting rings in place on the vertical portions of the base member.

References Cited in the file of this patent

UNITED STATES PATENTS

| 2,074,136 | Welch | Mar. 16, 1937 |
| 2,211,227 | Fiendel | Aug. 13, 1940 |
| 2,502,714 | Garnett | Apr. 4, 1950 |
| 2,957,665 | Feiertag | Oct. 25, 1960 |